United States Patent
Dortch (10) Patent No.: US 9,348,196 B1
(45) Date of Patent: May 24, 2016

(54) SYSTEM INCLUDING A SEAMLESS LENS COVER AND RELATED METHODS

(71) Applicant: Thermal Imaging Radar, LLC, Orem, UT (US)

(72) Inventor: Michael D. Dortch, Saratoga Springs, UT (US)

(73) Assignee: THERMAL IMAGING RADAR, LLC, Orem, UT (US)

( * ) Notice: Subject to any disclaimer, the term of this patent is extended or adjusted under 35 U.S.C. 154(b) by 0 days.

(21) Appl. No.: 14/456,329

(22) Filed: Aug. 11, 2014

Related U.S. Application Data (60) Provisional application No. 61/864,196, filed on Aug. 9, 2013.

(51) Int. Cl.
| | |
|---|---|
| *G03B 11/04* | (2006.01) |
| *B29C 45/00* | (2006.01) |
| *B29L 31/00* | (2006.01) |
| *B29K 23/00* | (2006.01) |

(52) U.S. Cl.
CPC .......... *G03B 11/041* (2013.01); *B29C 45/0055* (2013.01); *B29C 2045/0058* (2013.01); *B29K 2023/0683* (2013.01); *B29K 2995/0029* (2013.01); *B29K 2995/0097* (2013.01); *B29L 2031/764* (2013.01)

(58) Field of Classification Search
USPC .................................. 396/448; 264/239, 268
See application file for complete search history.

(56) References Cited

U.S. PATENT DOCUMENTS

| | | | |
|---|---|---|---|
| 3,336,810 A | 8/1967 | Schaffer et al. | |
| 3,648,384 A | 3/1972 | Roberts | |
| 3,769,501 A | 10/1973 | McDonough | |
| 4,263,513 A | 4/1981 | Palluet | |
| 4,602,857 A | 7/1986 | Woltz et al. | |
| 4,922,275 A | 5/1990 | Hughes | |
| 4,982,218 A | 1/1991 | Tsuboi et al. | |

(Continued)

FOREIGN PATENT DOCUMENTS

| | | |
|---|---|---|
| GC | 2014/27716 | 8/2014 |
| WO | 2013/109742 | 7/2013 |

(Continued)

OTHER PUBLICATIONS

KR-10-2009-0067762A Machine Transtion retrieved from K-PION website.*

(Continued)

*Primary Examiner* — Minh Phan
(74) *Attorney, Agent, or Firm* — Workman Nydegger (57) ABSTRACT

A seamless lens cover, and methods of forming such a seamless lens cover. The cap structure that covers a camera of a rotating panoramic camera system includes a seamless lens cover through which images are obtained by the camera. The cap structure may be injection molded at an initial lens cover thickness, and then a portion of the as molded initial lens cover thickness may be removed (e.g., by machining away) to achieve the final desired thickness. By such a method, the lens cover may be injection molded at thicknesses suitable for injection molding (e.g., about 0.06 to about 0.1 inch), after which most of the thickness may be machined away, to provide a seamless lens cover having a thickness of less than about 0.015 inch, exhibiting at least 60% transmittance to the thermal spectrum, no lensing characteristics, and no curvature effect.

20 Claims, 6 Drawing Sheets

(56) References Cited

U.S. PATENT DOCUMENTS

| | | | |
|---|---|---|---|
| 5,752,113 A | 5/1998 | Borden | |
| 5,790,183 A | 8/1998 | Kerbyson | |
| 5,807,950 A * | 9/1998 | Da Silva | B01J 21/04 |
| | | | 526/156 |
| 6,738,073 B2 | 5/2004 | Park et al. | |
| 6,948,402 B1 | 9/2005 | Amendolea | |
| 6,991,384 B1 | 1/2006 | Davis | |
| 6,992,722 B2 | 1/2006 | Jung | |
| 7,324,135 B2 | 1/2008 | Ouchi et al. | |
| 7,381,952 B2 | 6/2008 | Teich et al. | |
| 7,423,272 B2 | 9/2008 | Hasegawa et al. | |
| 7,436,438 B2 | 10/2008 | Sim et al. | |
| 7,732,771 B2 | 6/2010 | Hasegawa et al. | |
| 7,991,575 B2 | 8/2011 | Vogel et al. | |
| 8,106,936 B2 | 1/2012 | Strzempko et al. | |
| 8,194,912 B2 | 6/2012 | Kitaura et al. | |
| 8,285,512 B2 | 10/2012 | Vogel et al. | |
| 8,355,042 B2 | 1/2013 | Lablans | |
| 8,773,503 B2 | 7/2014 | Dortch et al. | |
| 2001/0026684 A1 | 10/2001 | Sorek et al. | |
| 2001/0027456 A1 | 10/2001 | Lancaster et al. | |
| 2002/0025023 A1 | 2/2002 | Herold et al. | |
| 2003/0025599 A1 | 2/2003 | Monroe | |
| 2004/0075741 A1 | 4/2004 | Berkey et al. | |
| 2004/0183941 A1 | 9/2004 | McCutchen | |
| 2007/0115527 A1 * | 5/2007 | Lee | G02B 26/121 |
| | | | 359/200.1 |
| 2008/0106593 A1 | 5/2008 | Arfvidsson et al. | |
| 2009/0051310 A1 | 2/2009 | Chandhoke | |
| 2010/0091089 A1 | 4/2010 | Cromwell et al. | |
| 2010/0097444 A1 | 4/2010 | Lablans | |
| 2010/0142757 A1 | 6/2010 | Sandstrom et al. | |
| 2011/0174762 A1 * | 7/2011 | Tsai | B29C 45/0013 |
| | | | 215/316 |
| 2011/0220797 A1 | 9/2011 | Hoelter et al. | |
| 2011/0316970 A1 | 12/2011 | Cheong | |
| 2012/0127169 A1 | 5/2012 | Barcay et al. | |
| 2012/0133639 A1 | 5/2012 | Kopf et al. | |
| 2012/0194564 A1 | 8/2012 | White et al. | |
| 2012/0299920 A1 | 11/2012 | Coombe et al. | |
| 2012/0300019 A1 | 11/2012 | Yang et al. | |
| 2012/0314066 A1 | 12/2012 | Lee et al. | |
| 2012/0320148 A1 | 12/2012 | Unger | |
| 2013/0002807 A1 | 1/2013 | Vogel et al. | |
| 2013/0030699 A1 | 1/2013 | Barnes et al. | |
| 2013/0048855 A1 | 2/2013 | Abreo | |
| 2013/0079955 A1 | 3/2013 | Masiello et al. | |
| 2013/0103303 A1 | 4/2013 | Lynch | |
| 2013/0113827 A1 | 5/2013 | Forutanpour et al. | |
| 2013/0188010 A1 | 7/2013 | Dortch et al. | |

FOREIGN PATENT DOCUMENTS

| | | |
|---|---|---|
| WO | 2013/109976 | 7/2013 |
| WO | 2014/169061 | 10/2014 |
| WO | 2014/169066 | 10/2014 |
| WO | 2015/021186 | 2/2015 |

OTHER PUBLICATIONS

U.S. Appl. No. 14/652,006, filed Jun. 12, 2015, Dortch, et al.
U.S. Appl. No. 14/652,009, filed Jun. 12, 2015, Dortch, et al.
U.S. Appl. No. 14/738,391, filed Jun. 12, 2015, Dortch, et al.
U.S. Appl. No. 29/523,032, filed Apr. 6, 2015, Dortch, et al.
U.S. Appl. No. 13/745,514, Jan. 10, 2014, Office Action.
U.S. Appl. No. 13/745,514, Apr. 11, 2014, Notice of Allowance.
U.S. Appl. No. 14/456,329, May 14, 2015, Restriction Requirement.
Chu, Elbert. "Invention Awards 2014: 360-Degree Infrared Vision." Popular Science. May 5, 2014. Web. Accessed Feb. 27, 2015.

* cited by examiner

SYSTEM INCLUDING A SEAMLESS LENS COVER AND RELATED METHODS

CROSS-REFERENCE TO RELATED APPLICATIONS

This application claims the benefit of U.S. Provisional Application No. 61/864,196 filed Aug. 9, 2013, titled "METHODS FOR ANALYZING THERMAL IMAGE DATA USING A PLURALITY OF VIRTUAL DEVICES, CORRELATING DEPTH VALUES TO IMAGE PIXELS, AND A SYSTEM INCLUDING A SEAMLESS LENS COVER", which is incorporated herein by reference in its entirety.

BACKGROUND

1. The Field of the Invention

The present invention is in the field of automated camera systems capable of taking images at a plurality of stop positions (e.g., in a panorama), and in particular a seamless lens cover for use therewith.

2. The Relevant Technology

Panoramic images can be created by an array of wide angle cameras that together create up to a 360 degree field of view or by one camera with a fish eye lens or other panoramic mirror that allows for a continuous "mirror ball" image that is later flattened out by computer. These images are limited in their ability to provide detail necessary to be useful for video surveillance because the sensors are stretched over wide fields of view (sometimes a full 360 degrees).

A relatively new means of capturing thermal panoramic images is by continuously spinning a cryogenically cooled thermal sensor or other high speed camera at less than 60 RPM and processing the images from the camera with a computer where they are stitched together and analyzed. These cryogenically cooled sensors have the ability to capture images in just a few nanoseconds, which allows them to produce near real time video. However, these cooled sensors are power hungry and expensive, making them impractical in many applications. In addition, the high speed cameras have very large lighting requirements making them of very limited use in other than full daylight conditions.

Even with existing advancements in the art, there still exists a need for improved camera systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Implementations of the present invention are directed to camera systems including a cap structure that covers the camera. The cap structure includes a seamless lens cover. The present invention is also directed to related methods of use for the system. The invention also relates to methods of manufacturing the seamless lens cover. The seamless lens cover may comprise a cylindrical sidewall of the cap structure in which the cylindrical sidewall has a finished thickness of less than 0.05 inch, less than 0.025 inch, or less than 0.015 inch, and in which the lens cover includes no seams. By way of example, the sidewall that serves as a lens cover may have a finished thickness of about 0.009 inch to about 0.013 inch. The cap structure may be injection molded or otherwise provided with the sidewall at an initial thickness that is greater than the desired final thickness. The thickness of the cylindrical sidewall may then be machined or otherwise worked to remove a portion of the initial thickness of the sidewall to achieve the desired final thickness. In an embodiment, the as provided (e.g., injection molded), initial thickness may be about 0.1 inch, or from 0.06 to 0.1 inch.

These and other advantages and features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

I. Introduction

The present invention is directed to methods for forming a seamless lens cover for a camera, e.g., a cap structure including such a lens cover, where the cap structure covers or caps a camera of a camera system. The cap structure includes the seamless lens cover for the camera, protecting the camera and other internal structure under the cap structure from the elements (e.g., such systems are typically placed outdoors), while at the same time allowing the camera of the system to capture images (e.g., thermal images in the infrared spectrum—e.g., about 8000 nm to about 14000 nm) through the seamless lens cover, without any degradation of image quality associated with a seam. Because the lens cover is seamless, 360° image capture without any degradation due to a seam is possible. In addition, the lens cover can be formed so as to exhibit no significant lensing characteristics (i.e., minimal to no artifacts introduced by the presence of the lens cover), and no significant curvature effect (i.e., no significant distortion of the image due to the curvature of the lens cover). The lens may exhibit some loss in transmission (e.g., at least about 60% transmission, such as 65-70% transmission), but exhibits sufficient transmission through the seamless lens cover to provide excellent results. In addition to the above characteristics, the lens cover exhibits minimal reflection (e.g., particularly at the exterior surface), and low diffraction of incident wavelengths.

The method by which the seamless lens cover is formed (e.g., as part of an overall cap structure) may include providing the cap structure with an initial lens cover thickness that is greater than the final desired thickness. For example, the cap structure may include a generally cylindrical sidewall that serves as the lens cover. The lens cover may be injection molded or otherwise formed at an initial "thick" thickness without any seams. A portion of the initial lens cover thickness is removed (e.g., by machining it away) to achieve the desired final thickness. In addition to removal by machining, the lens cover may be sanded (e.g., wet sanded) and polished (e.g., wet polished) after machining to achieve the final desired thickness, smoothness, transmission, and other optical characteristics.

The seamless lens cover and associated method of manufacture are particularly advantageous. For example, the inventors were told repeatedly by those of skill in the art that it would be impossible to injection mold, thermoform, or otherwise form or mold the desired cap structure including a seamless lens cover having the needed thickness characteristics so as to provide the desired performance characteristics. For example, the final desired thickness in the sidewall that serves as the lens cover may be less than 0.025 inch, no more than about 0.015 inch, or between about 0.009 inch and 0.013 inch. At such thin cross-sections, it proved a practical impossibility to injection mold the cap structure including the seamless lens cover. Injection molding would be particularly advantageous as it would allow the formed cap structure to be a single integral piece, formed of a single integral piece of material.

In testing to determine if such injection molding were possible (even after being told it was a practical impossibility by those of skill in the art), the inventors found that trying to injection mold the material was not possible. For example, when using a thermoplastic material such as a polyolefin, e.g., polyethylene, such as an ultra-high molecular weight polyethylene (UHMWPE), it was practically impossible to prevent streaking or burning within the thin-walled seamless lens portion of the cap structure due to temperature issues, even while operating the injection molding apparatus at the highest possible pressures. In addition to these problems, the thickness consistency within the seamless lens sidewall portion was much too eccentric and variable, the sidewall thickness of the lens cover was still too thick, and other problems were repeatedly encountered. As a result, the rejection rate was about 98% (i.e., only 1 in 50 manufactured parts were acceptable in most regards, other than the sidewall was still too thick, eccentric, etc.). As a result, none of the product produced in injection molding testing actually met the desired specifications.

The inventor also attempted formation through thermoforming. The inventor was told repeatedly that thermoforming structures (e.g., disposable plastic cups) can be practical where the taper of the sidewall is at least 5°. The cap structure as illustrated includes no taper, but the sidewall that serves as the lens cover is vertical in use. The inventor was told that because there was no angle or taper of at least 5° it would not be possible to thermoform the cap structure. The thermoforming tests were also unsuccessful. The fact that the cap structure includes no taper is beneficial from a performance perspective, as the radial distance of the sidewall serving as the lens cover to the camera is the same, independent of the location along the height of the sidewall. For example, if a taper were provided, the sidewall would be inclined somewhat off relative to vertical, so that a location near the top of the sidewall would exhibit a different distance from the camera as compared to a location near the bottom of the sidewall. Such differences would be expected to introduced artifacts into the captured images. Thus, while beneficial from a performance perspective, the lack of any significant taper (e.g., no taper, incline, or slope at all—but rather a vertical surface) makes it not possible to form the cap structure including the lens cover sidewall from thermoforming.

Thus, as described, it was not possible as a practical matter to fabricate the cap structure including a sidewall that could serve as a lens cover using injection molding or thermoforming. The inventor developed an alternative method of fabrication which has surprisingly been found to allow production of the desired parts, with acceptably low rejection rates (e.g., less than 10%, less than 5%, less than 2%, or less than 1%), all while providing the desired seamless lens cover that is an integral part of a cap structure that may be injection molded as a single piece of material, without any seams. In order to achieve this, the cap structure is provided (e.g., through injection molding) in an initial thickness with respect to the sidewall that will eventually serve as the lens cover. At these initial thicknesses, injection molding is readily achievable. The sidewall is subsequently worked (e.g., machined), to achieve the desired thicknesses in the sidewall of the cap structure, so as to result in a seamless lens cover having the various desired characteristics.

Upon seeing the finished product, others of skill in the art still wonder how the present inventor could have ever produced such a structure, particularly in a manner that would allow large scale manufacture with consistent quality and low to no rejection rates for parts. For example, their exclamation is often "how did you do that!?".

Figure 1:
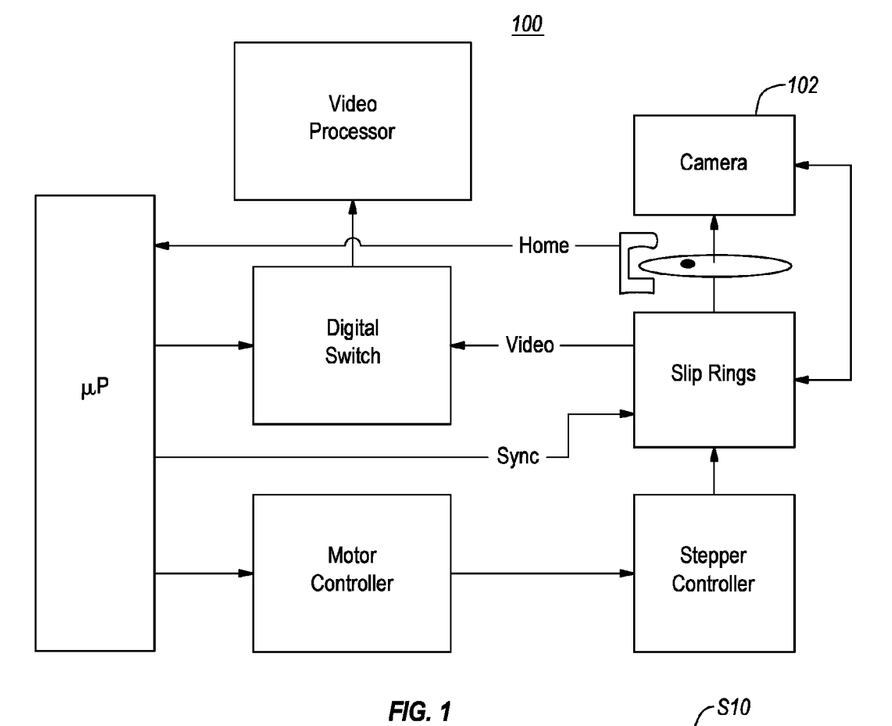
FIG. 1 illustrates a schematic block diagram showing an exemplary camera system in which the seamless lens cover may be employed.

II. Exemplary Systems Including a Seamless Lens Cover and Methods of Manufacture FIG. 1 illustrates a block diagram for an exemplary camera system 100 in which the seamless lens cover described herein may be employed. Camera system 100 allows camera 102 (e.g., a thermal imaging camera) to rotate up to a full 360° around a fixed-axis. The full revolution comprises a number of positions corresponding to "stops" where it is desired that an image be captured. The spectrum captured may be long wavelength infrared (LWIR), from about 8-14 μm (8000 nm to about 14,000 nm). Of course, it may be possible to employ concepts disclosed herein within systems configured to capture and use image data based on other spectrums (e.g., visible light, or higher or lower wavelengths). Thus, the sensor of the camera may be configured to capture LWIR wavelengths, visible light wavelengths, or other wavelengths or light (i.e., electromagnetic radiation). Capture of the LWIR spectrum is particularly beneficial because it can "see" through darkness, making it suitable for use any time of day or night, and it less affected by fog, clouds, or other features that might obscure imaging based on the visible spectrum. As the camera rotates, it is periodically stopped at designated stop positions, where the camera is momentarily stopped and an image is captured. The camera then rotates to the next stop position, obtaining the next image, and so forth, through the full revolution. The camera may appear to rotate continuously, because the dwell or stop times associated with each stop position may be so short (e.g., about 60 ns). Additional details of the camera system and its use are disclosed in the above reference provisional application, and PCT Patent Application PCT/US14/49986 filed Aug. 6, 2014, herein incorporated by reference in its entirety. Additional details of such systems are disclosed in PCT Patent Application Serial No. PCT/US/2014/033539, PCT Patent Application Serial No. PCT/US/2014/033547, and U.S. Pat. No. 8,773,503, each of which is herein incorporated by reference in its entirety.

Figure 2:
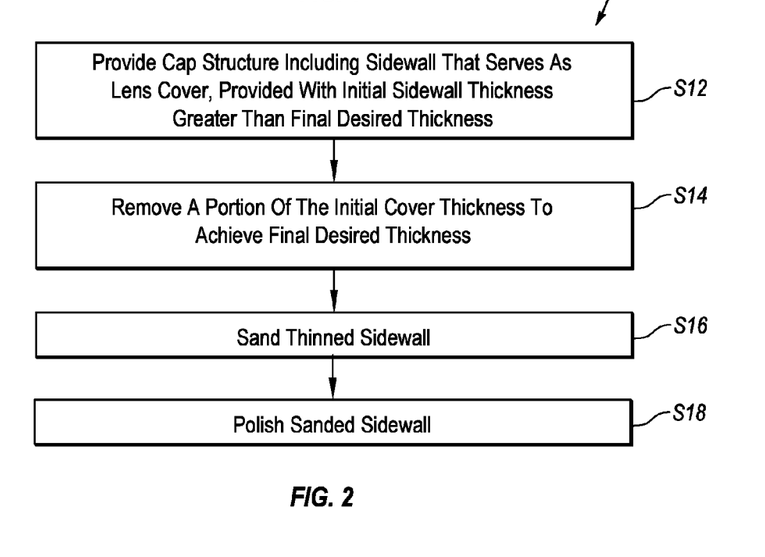
FIG. 2 is a flow diagram illustrating an exemplary method by which the cap structure including the seamless lens cover may be manufactured.

A seamless lens may form part of a cap structure that covers or encapsulates the camera 102, so that it is protected from the outdoor elements, while being able to capture images across a full 360° panorama without a typically present seam negatively affecting image quality. FIG. 2 illustrates an exemplary method S10 by which such a seamless lens may be formed. For example, at S12, the cap structure may be provided. Such a cap structure may be injection molded or otherwise formed, provided in a condition where the sidewall (e.g., a closed generally cylindrical loop) that serves as the lens cover is of an initial as molded thickness (e.g., about 0.1 inch to about 0.06 inch) that is greater than the final desired thickness (e.g., about 0.009 inch to about 0.013 inch). At S14, a portion of the initial cover thickness is removed (e.g., machined away), so as to achieve the desired final thickness. The resulting surface may be sanded (S16) and/or polished (S18) to provide a finished smooth surface having the desired characteristics (e.g., high transmittance, low reflectance, low diffusion, good durability, etc.)

Figure 3A:
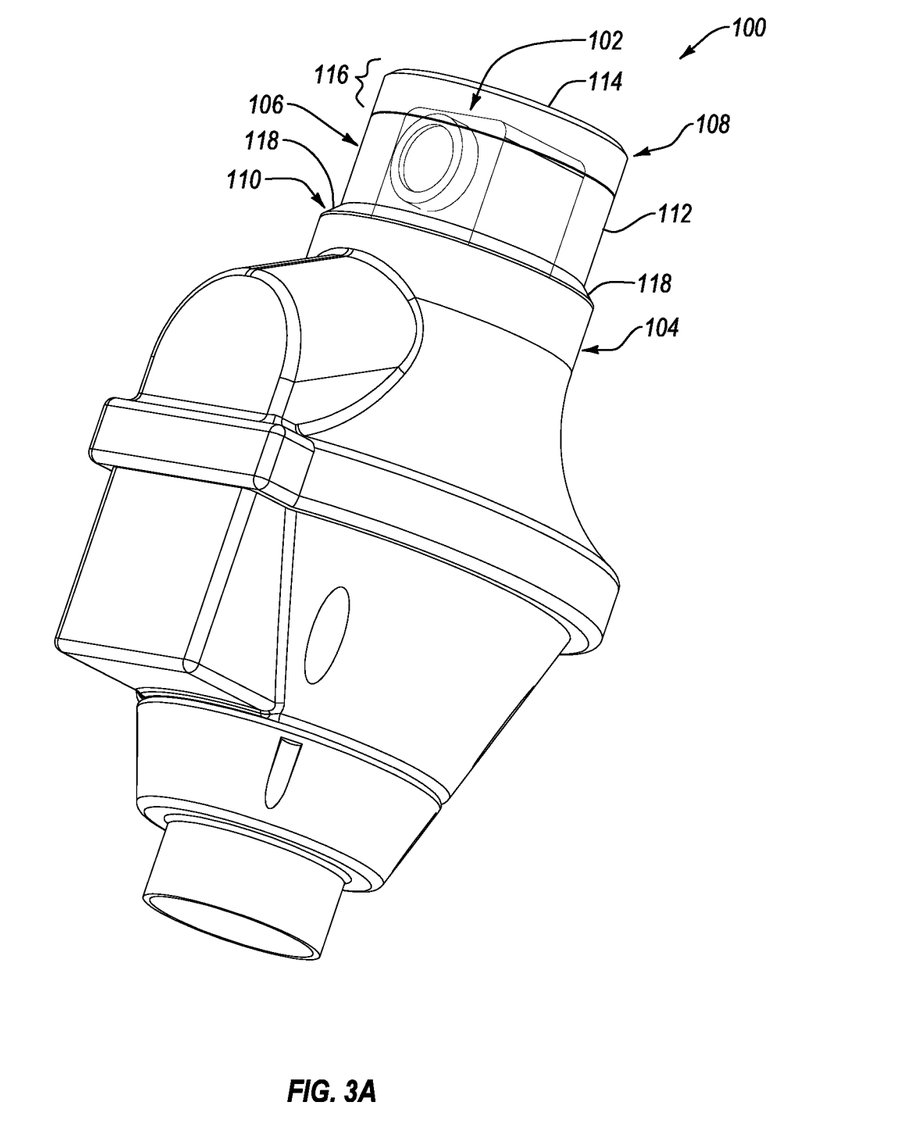
FIG. 3A is a perspective view of an exemplary camera system including a cap structure providing a seamless lens cover.
Figure 3B:
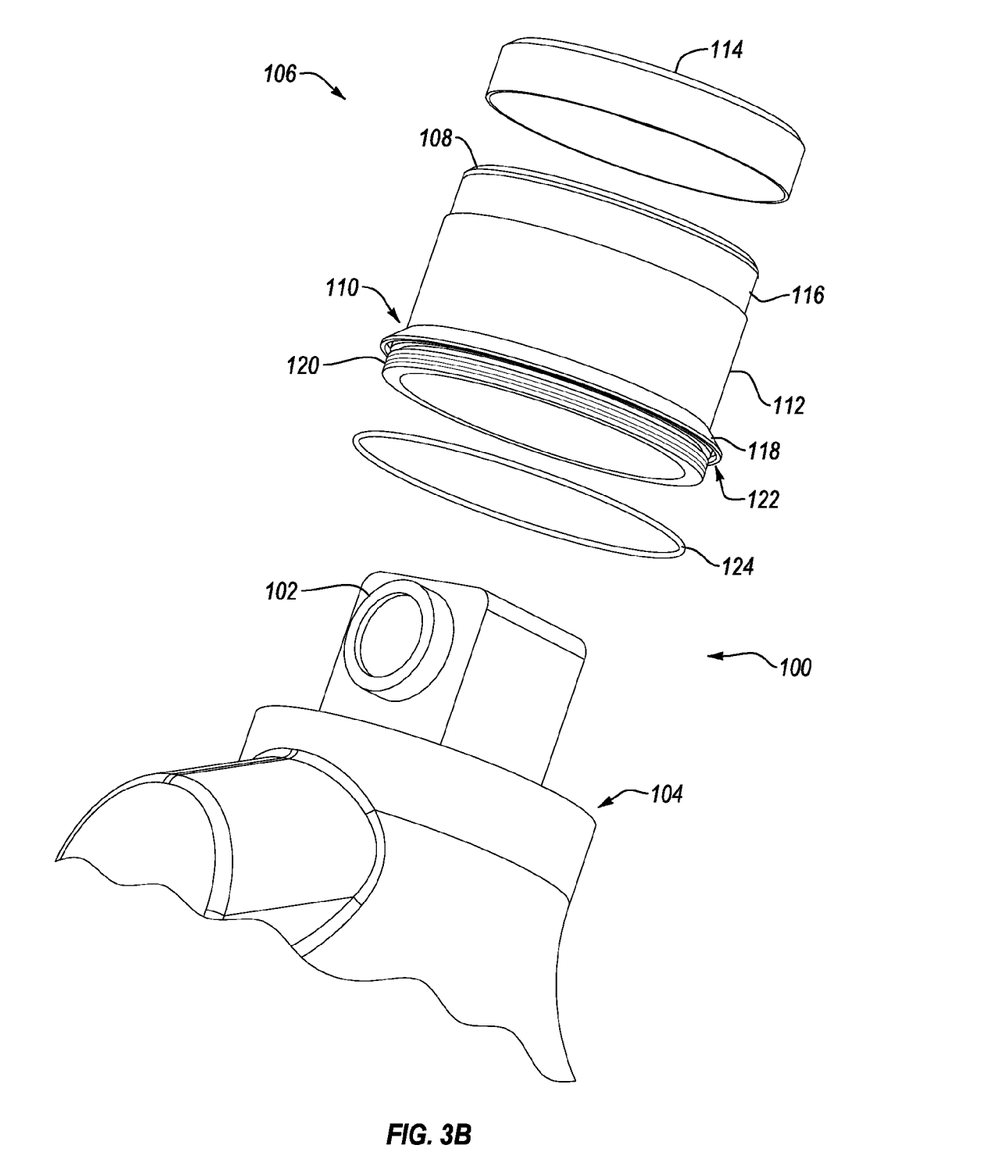
FIG. 3B is an exploded perspective view illustrating the cap structure in greater detail.

FIGS. 3A and 3B show perspective and exploded views, respectively, of an exemplary camera system 100 including the cap structure 106 with the seamless lens cover 112. System 100 includes a camera 102 mounted on an indexing mechanism 104, which rotates the camera 102 through the plurality of stop positions. System 100 further may include the various desired electronic processors for sorting, analyzing, storing, and otherwise using or manipulating the image data and other relevant data obtained with system 100. As described in the referenced related applications, the images may specifically not be stitched together to create a panoramic image, but stored and processed individually (e.g., as if a stationary camera were positioned at each stop position). The lack of such stitching greatly reduces the power and computing requirements of the system.

As described herein, system 100 further includes a cap structure 106 that covers camera 102 of system 100. Cap structure 106 may be of a closed shape, so as to fully circle about camera 102. In an embodiment, it may be generally cylindrical in shape, including a top end 108 (e.g., closed) and an open bottom end 110, allowing cap structure 106 to be placed over camera 102, encapsulating and protecting camera 102 therein. Cap structure 106 includes a sidewall 112, which serves as the lens cover through which camera images are obtained. Sidewall 112 may define the outer perimeter or diameter of a hollow cylindrical body, where the cylindrical wall includes no seams. Sidewall 112, also referred to herein as lens cover 112, is seamless, so as to not include any seams as a result of the molding or other fabrication process. In an embodiment, as shown, lens cover 112 may be generally cylindrical in shape, forming a closed loop shape (e.g., circling around the camera 102). As described above, sidewall 112 may be vertical in use, rather than including any taper, slope, or incline (referred to herein collectively as taper for simplicity). In another embodiment, minimal taper could be present (e.g., less than 4°, less than 3°, less than 2°, or less than 1°), although no taper is preferred, as described above. As such, the sidewall 112 may be characterized as being substantially vertical.

Such a lens cover 112 is particularly well suited for applications in which a full 360° panorama is to be under surveillance. Of course, less than a full 360° may be monitored, and in such embodiments a seamless lens cover may not be necessary (e.g., the seam could be placed where no monitoring is done). In other embodiments, even though less than a full 360° may be monitored, a seamless lens cover extending the full 360° may be employed. For example, the system could be programmed or otherwise set up and configured to monitor less than 360°, even though the system may be capable of monitoring the full 360°.

The cap structure 106 may be coupled to a top cap 114 (e.g., a plastic, other material, rubber or other elastomeric cap) placed over a top portion 116 of structure 106, above lens cover 112, and adjacent closed top end 108. In another embodiment top end 108 may not be fully closed, but closure and sealing of the internal space may be provided by cap 114. As shown, the top portion 116 over which cap 114 is placed may be of a width (e.g., diameter) that is less than the width (e.g., diameter) of lens cover portion 112. Adjacent bottom end 110, a thickened flange 118 may be provided, e.g., including structure for securing cap structure 106 to the adjacent portion of system 100. For example, flange 118 may be outwardly flared, extending radially outward from the bottom of sidewall 112, adjacent bottom end 110. Flange 118 may include threads 120 or other coupling structure for engagement with corresponding coupling structure of system 100 to which cap structure 106 is to be secured. In the illustrated embodiment, outwardly flared flange 118 further includes an annular groove 122 into which a sealing o-ring 124 may be placed. Threads 120 and groove 122 may be machined into bottom end 110 after injection molding, or one or both may be formed during injection molding, as desired.

Figure 4A:
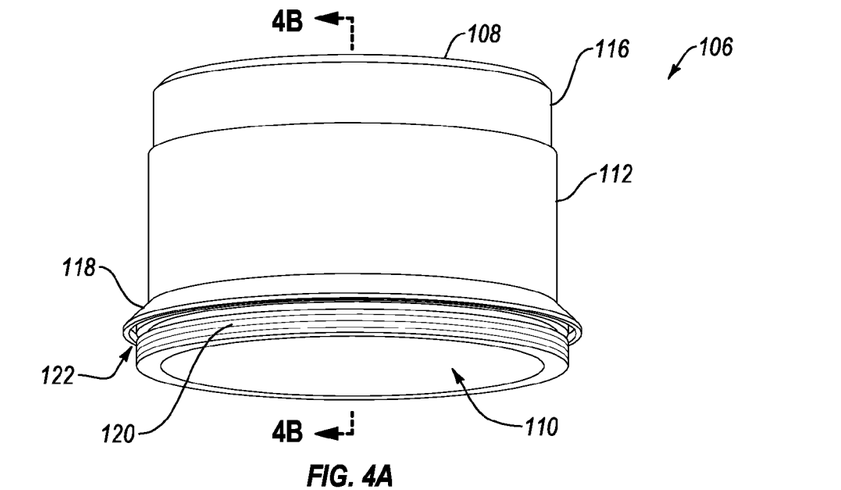
FIG. 4A is a perspective side view of an exemplary cap structure as initially injection molded, having a thick sidewall to be subsequently thinned.
Figure 4B:
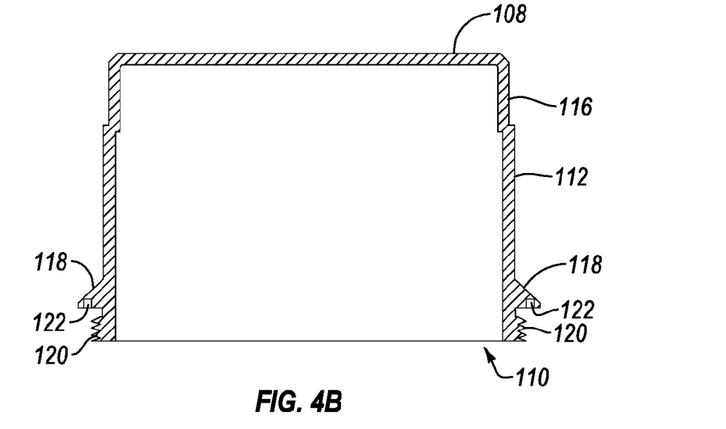
FIG. 4B is a cross-sectional view through the injection molded cap structure of FIG. 4A.

FIGS. 4A-4E progressively illustrate how the as provided (e.g., injection molded) cap structure 106 may be altered from its as provided condition so as to provide a sidewall 112 that is sufficiently thin to serve as the seamless lens cover. For example, FIGS. 4A and 4B illustrate perspective and cross-sectional views, respectively, of cap structure 106, as provided (e.g., as injection molded). For example, sidewall 112 (and optionally adjacent top portion 116) may be initially molded at a thickness at which injection molding is practical. For example, the initial thickness of sidewall lens cover 112 may be about from about 0.06 inch to about 0.1 inch), e.g., about 60 thousandths of an inch thick (i.e., 0.060 inch). At such thicknesses for the dimensions of the cap structure (e.g., about 2.5 to about 3 inches in diameter), molding of such a structure is well within the capabilities of a typical injection molding apparatus. By injection molding, no seams are present within sidewall 112, as one circles the perimeter thereof.

Sidewall 112 may be cylindrical, rather than cone or truncated cone shaped—which would include a tapered sidewall, as described above. For example, the sidewall 112 may include no taper, less than 1% taper, less than 2%, less than 3%, or less than 4% taper. Sidewall 112 may be referred to as being a substantially cylindrical and substantially vertical sidewall, in this respect. Because of the lack of at least a 5% taper, the inventor was told repeatedly that it would not be possible to form such a structure through thermoforming.

Once molded at such an initial thickness, from a suitable thermoplastic material (e.g., ultra-high molecular weight polyethylene "UHMWPE") the sidewall 112 appears opaque, and cannot readily serve as a lens cover through which thermal images can be captured, as the transmittance is much too low. In order to alter the sidewall 112 so that it could be used as a seamless lens cover, most of the material thickness of sidewall 112 is removed. For example, the sidewall 112 may be reduced in thickness to about 0.009 inch to about 0.013 inch. At this thickness, sidewall 112 exhibits transmission characteristics of about 65 to about 70% (e.g., at least 60%) relative to the desired LWIR wavelengths. In addition, the portion of sidewall 112 may be removed and finished in a manner that the finished product exhibits no substantial lensing characteristics or curvature effects due to the presence of the lens cover 112.

In addition to the described transmission characteristics, the finished surface of sidewall 112 that serves as the seamless lens cover is smooth to the point of being non-diffractive relative to the desired wavelengths. In addition, it exhibits limited, if any reflection. It is believed that the machined and polished surface of sidewall 112 exhibits a reflection that is no more than about 10%, or no more than 5% with respect to the target wavelengths. For example, reflectance may be no more than 30%, no more than 25%, no more than 20%, no more than 15%, no more than 10%, no more than 5%, no more than 3%, or no more than 1%. Diffraction may be similarly low. As a result, the surface provides minimal interference and artifacts as the wavelengths of interest pass there-through and are captured by camera 102.

The portion of sidewall 112 to be removed may be removed by machining, although this is a relatively delicate operation, as the UHMWPE exhibits very long molecular chain lengths. In other words, its micro-structure is such that it tends to want to tear out in chunks, strips or chains, rather than be removed with precision, in minimal thickness and portions, progressively.

Figure 5:
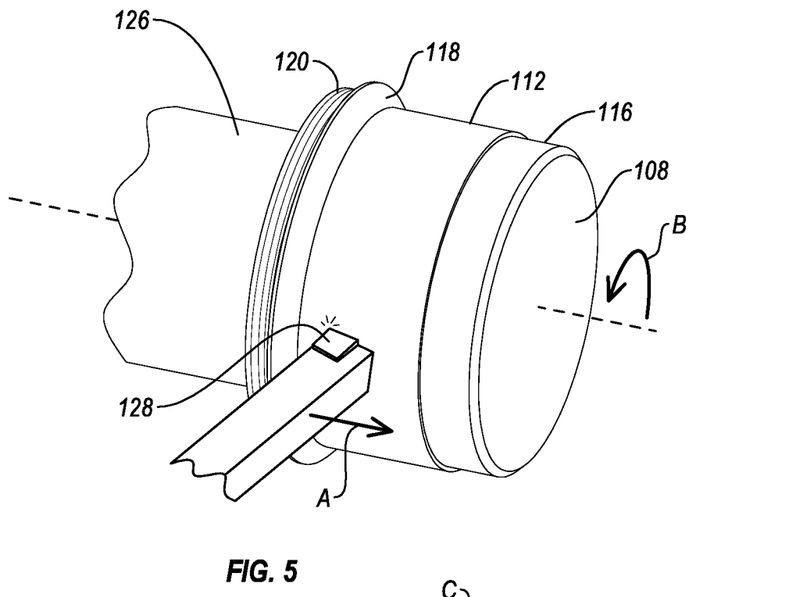
FIG. 5 illustrates how the cap structure of FIG. 4A-4B may be placed over a mandrel and machined using a lathe cutting tool to remove a portion of the thickness of the sidewall that becomes the seamless lens cover.

FIG. 5 schematically illustrates an exemplary apparatus for performing this step of removing a portion of the thickness of sidewall 112, without tearing out sections of sidewall 112, as removed portions rip out adjacent sections due to the characteristics of the UHMWPE. Such ripping or tearing destroys surface 112. For example, the as provided cap structure 106 is placed over a mandrel 126. Mandrel 126 is rotated at relatively high speed (e.g., from about 1000 RPM to about 1800 RPM, or from about 1200 to about 1500 RPM), referring to arrow B. Rotation may be clockwise or counterclockwise, depending on the location of cutting tool 128 and other factors.

Because of the high rotational speed of mandrel 126, at least sidewall 112 actually lifts off mandrel 126, creating a space or gap between sidewall 112 and mandrel 126. Other portions of the cap structure 106 may continue to contact and be secured to mandrel 126 so that structure 106 continues to rotate with mandrel 126. As mandrel 126 rotates cap structure 106, sidewall 112 is contacted with a cutting tool (e.g., a CNC lathe blade 128) which progressively cuts away very small portions of the exterior of sidewall 112, as shown in FIG. 5. The feed rate at which cutting tool 128 progresses axially (arrow A) along the height of sidewall 112 may be such that it may take less than about 10 seconds for each pass (e.g., about 5 seconds to about 10 seconds, or about 5 seconds to about 8 seconds). For example, if the height to be machined is from about 3 cm to about 5 cm, the axial feed rate may be from about 3 mm/s to about 10 mm/s, or from about 3 mm/s to about 6 mm/s.

In an embodiment, multiple passes of cutting tool 128 may be used to achieve the desired thickness at the end of the machining step. For example, this may be helpful to counteract the tendency of the material to tear out, rather than be removed cleanly, at only the depth of cut. For example, 3 to 4 passes of cutting tool 128 may be employed to remove that portion of the thickness of sidewall 112 to be removed. For example, the final pass may be configured to remove from about 0.005 inch to about 0.03 inch, from about 0.010 inch to about 0.015 inch, or about 0.010 inch to about 0.012 inch in thickness from sidewall 112. The previous passes may be configured to remove approximately equal portions of thickness, relative to one another.

For example, where the initial as molded thickness of sidewall 112 is about 0.060 inch, and the final desired thickness is from about 0.009 inch to about 0.013 inch (e.g., 0.010 inch), and the thickness removed in the final pass is from about 0.010 to about 0.012 inch (e.g., 0.010 inch), where 4 passes total are employed, the first through third passes may each remove equal amounts (e.g., about 0.013 inch) of the thickness of sidewall 112. Where only 3 passes total are employed, and the final pass removes 0.010 to about 0.012 inch, the first and second passes may each remove about 0.02 inch.

The subsequent sanding and polishing steps may remove little if any bulk thickness from sidewall 112, rather serving to smooth the surface to the desired smoothness for the desired high transmittance, low reflectance, and low diffraction characteristics. In other words, the sanding and polishing may remove protrusions or roughness from the surface, bringing the higher prominent surfaces down. For example, the sanding and polishing steps may remove less than 0.001 inch in thickness from sidewall 112, if removing any of the bulk thickness at all.

The lathe blade or other cutting tool 128 is very sharp in order to minimize the tendency of the material to tear out, rather than be cleanly cut, at the desired depth. The tool sharpness in combination with the progressive removal of the thickness (e.g., in portions of from about 0.005 inch to about 0.03 inch, or from about 0.01 inch to about 0.02 inch in a pass) minimizes the otherwise prevalent tendency of the material (e.g., UHMWPE) to tear out, rather than being cut. Commercially available lathe cutting tools (e.g., formed of high hardness metal carbide materials) are suitable for use. Such tools are available from Mitsubishi under the name MITSUBISHI CARBIDE. In addition to the tool sharpness, the cutting tool is of high precision (e.g., use of a 2 ten-thousandths (0.0002 inch) precision tool). Lubricant and/or coolant may be applied during the machining step to lubricate and cool sidewall 112 and cutting tool 128.

Top portion 116 may also be thinned along with sidewall 112, if desired. Of course, this may not generally be necessary, as such portions do not serve as a lens cover through which the LWIR wavelengths are transmitted and captured by camera 102.

Figure 4C:
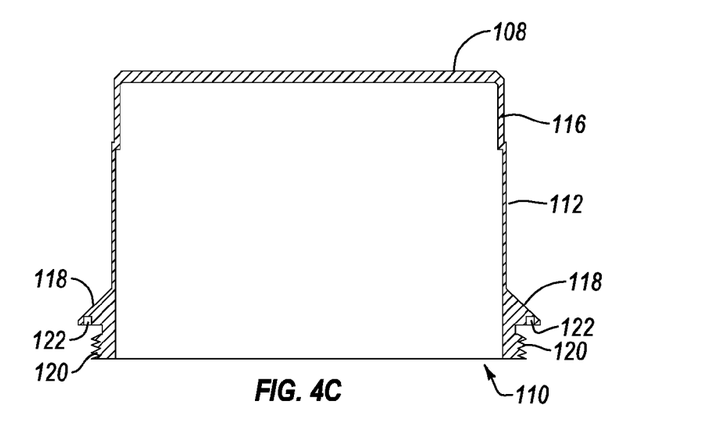
FIG. 4C is a cross-sectional view similar to that of FIG. 4B, but after the sidewall which serves as the lens cover has been thinned by removing a portion of the sidewall thickness.
Figure 4D:
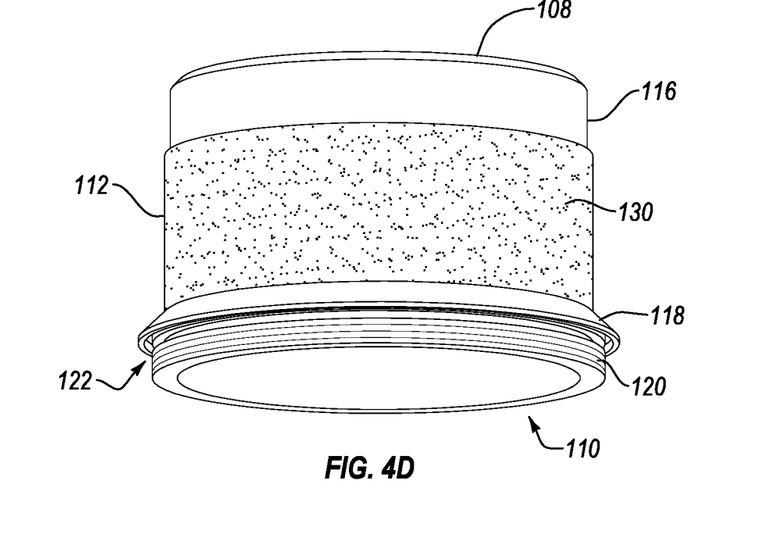
FIG. 4D illustrates the cap structure after the sidewall has been thinned, and the thinned sidewall has been sanded.

After the machining operation, the cap structure 106 may appear as in FIG. 4C, having a substantially thinner sidewall 112 than previously (FIG. 4B). For example, at least about 50%, at least about 75%, or about 80% to about 85% of the thickness of sidewall 112 may have been removed. At this thickness, the sidewall 112 may appear somewhat translucent, but may not yet exhibit transmittance characteristics that are as high as the finished surface of FIG. 4E, e.g., due to surface roughness. Once the machining operation is completed, the surface of sidewall 112 may be wet sanded (e.g., with application of lots of water or other lubricant) using a very fine grit sandpaper (e.g., 1000 grit). FIG. 4D illustrates how such a sanded texture 130 may result. Such fine sanding may begin to further smooth the lens cover surface 112, removing some of the more prominent "high" surface features. Sanding may be performed across the grain.

Figure 6:
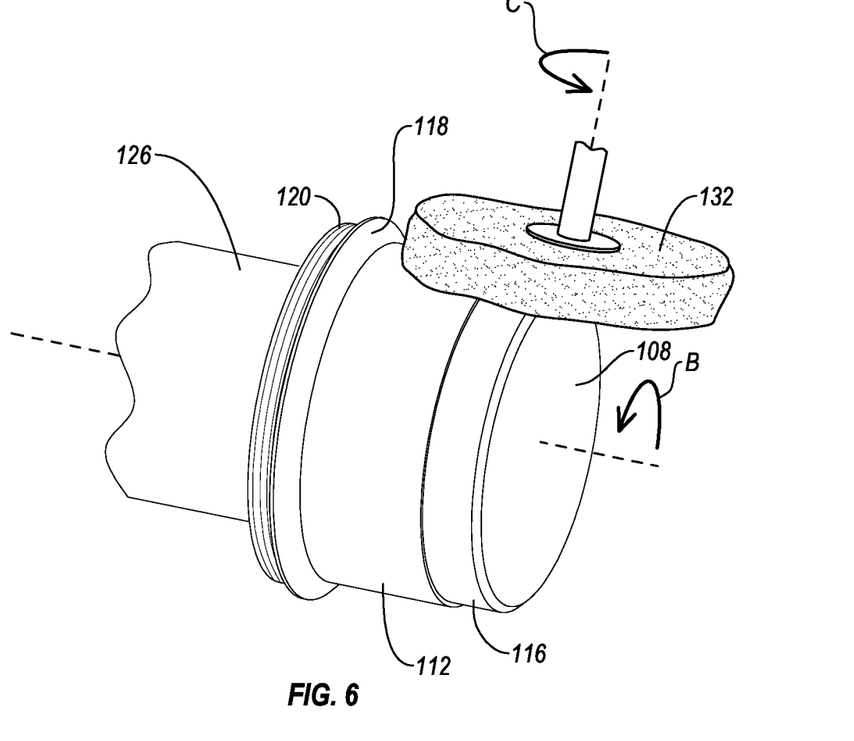
FIG. 6 illustrates how the cap structure of FIG. 4D may be placed over a mandrel and polished using a plurality of differently configured foam pads to achieve the final surface finish for the sidewall which serves as the seamless lens cover.

Once sanded, surface 112 is ready for polishing. FIG. 6 schematically illustrates how such polishing may proceed. Polishing further smooths the surface of sidewall 112, to achieve the final desired very smooth surface finish, having the desired high transmittance, low reflectance, and low diffraction characteristics. No further treatment or coating of surface 112 is needed, although if desired, coatings (e.g., to further lower reflectance, diffraction, etc.) could be applied, if desired. It is advantageous that the UHMWPE material alone (without any such coatings) provides the desired characteristics, and is sufficiently durable at the relatively thin wall thickness (e.g., 0.009 inch to 0.013 inch). Many other polyolefin materials (even other polyethylene materials) simply cannot provide the desired high transmittance, low reflectance, and low diffraction characteristics, particularly while being sufficiently durable at that wall thickness. A suitable UHMWPE material is POLY IR2, available from Fresnel Tech., located in Dallas, Tex. Although details of the POLY IR2 material are proprietary, it is believed to be a polyethylene copolymer, and may include additives for improved UV stability, which is helpful where it is contemplated that the lens covers will remain outdoors, exposed to the environment for long periods of time (e.g., years). Although the molecular weight of the POLY IR2 UHMWPE material is not known specifically, it is believed to be from about 2 million to about 6 million Daltons/mole. Such UHMWPE materials are very tough, with the highest impact strength of any known thermoplastics. The number of monomers per molecule in the UHMWPE is believed to be from perhaps 100,000 to about 250,000, much higher than for high density polyethylene (HDPE). Such UHMWPE materials exhibit very high strength (e.g., greater than 1 GPa, greater than 1.5 GPa, greater than 2 GPa, e.g., about 2.4 GPa), and density near that of water (e.g., about 0.97 g/cm$^3$), for very high strength to weight ratios.

The inventor attempted various unsuccessful methods of polishing of the thin-walled lens cover 112. Polishing such a thin sidewall 112 has been described by the inventor as akin to attempting to polish butter, as it is very difficult to achieve the desired surface finish in such a thin sidewall without destroying the surface (e.g., wearing holes in it, causing it to buckle, crease, or fold, etc.). Conventional polishing procedures were found to destroy the sidewall and its exterior surface. For example, it was found that buffing wheels as commonly used in various polishing procedures will not work. Lambs wool, and cloth polishing surfaces did not work. It was found that use of a foam pad for polishing could work, when care is taken.

Figure 4E:
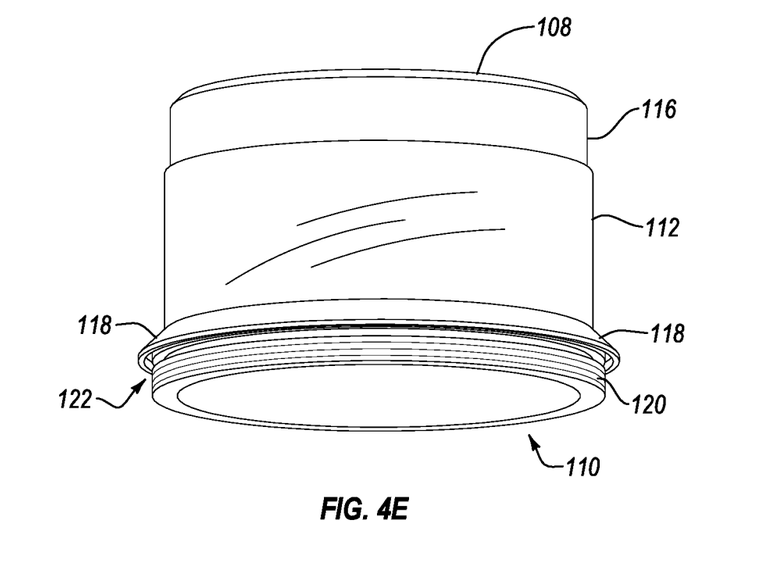
FIG. 4E illustrates the cap structure after the sidewall has been polished, providing the finished surface that serves as the seamless lens cover.

FIG. 6 schematically illustrates polishing of sidewall 106 after sanding, resulting in the finished cap structure 106 as seen in FIG. 4E. Cap structure 106 may again be placed over a mandrel 126. While polishing, sidewall 112 is contacted with a rotating polishing wheel covered with a foam pad 132. The mandrel 126 may rotate cap structure 106 very slowly (e.g., less than about 10 RPM, less than about 5 RPM, or about 3 to 4 RPM—referring to arrow B), while the polishing wheel and foam pad 132 is rotated at a much higher rate (e.g., about 1200 RPM to about 2000 RPM, about 1500 RPM to about 2000 RPM, or about 1800 RPM—referring to arrow C). Polishing may be achieved in a two-step process, using a first foam pad and a first polishing compound, and then polishing with a second foam pad and a second polishing compound. Both polishing steps may be performed wet, with water or other lubricant. The first foam pad may be differently configured than the second foam pad, and similarly the first polishing compound may be differently formulated than the second polishing compound.

The first foam pad may be of a coarser foam structure than the second foam pad. Commercially available polishing foam pads may be employed. For example, MEGUIARS soft pads have been found to be suitable for use. The MEGUIARS pads are color coded. MEGUIARS red "cutting foam pad" and the MEGUIARS yellow "polishing foam pad" have been found to be suitable for use as the first and second foam pads, respectively. The red cutting foam pad is of a coarser foam (e.g., cell size) than the yellow pad, which exhibits a finer foam structure.

Polishing compounds that are commercially available may be used with the foam pads. The first polishing compound may include a fine grit, while the second polishing compound may include less, or no such grit. For example, an example of a suitable first polishing compound is MEGUIARS No. 4 "heavy cut cleaner". It includes a fine grit than can be felt when rubbing the composition between the thumb and finger. An example of a suitable second polishing compound is MEGUIARS No. 2 "fine cut cleaner". No grit is felt when rubbing the composition between the thumb and finger. After polishing using the first foam pad and corresponding first polishing compound, the cap structure 106 (e.g., sidewall 112) may be rinsed and wiped before polishing with the second foam pad and the second polishing compound.

Once polished, the surface 112 may exhibit higher transmittance than the surface at FIG. 4C or 4D. The surface may still not appear transparent to the eye (visible light wavelengths), but exhibit a translucent appearance. The surface is smooth, advantageously exhibits relatively high transmission to the target LWIR wavelengths of interest, low reflection and diffraction, and does not exhibit any significant lensing artifacts, curvature artifacts, etc.

It must be noted that, as used in this specification and the appended claims, the singular forms "a," "an" and "the" include plural referents unless the content clearly dictates otherwise. In some embodiments, any reference to thickness, other dimensions, or other numerical values may vary by up to 10% (e.g., "about" in some embodiments may refer to ±10%, ±5%, or ±3%).

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for forming a cap structure that covers a camera of a camera system, the cap structure including a seamless lens cover for the camera system, the method comprising the steps of:
   injection molding the cap structure from an ultra-high molecular weight polyethylene material, the cap structure including a generally cylindrical shape having a top end, an open bottom end, and a cylindrical sidewall extending therebetween, the cylindrical sidewall being a lens cover through which images are obtained from the camera disposed within the cap structure during use, at least the lens cover of the cap structure being molded so as to be seamless and at an initial thickness that is greater than a final desired thickness, the initial as molded sidewall thickness being from about 0.060 inch to about 0.1 inch;

machining away a portion of the initial sidewall thickness to achieve a reduced thickness after machining that is less than 0.025 inch;

wet sanding the lens cover using fine grit sandpaper;

wet polishing the lens cover using a first foam pad and a first polishing compound;

wet polishing the lens cover using a second foam pad and a second polishing compound, the second foam pad and the second polishing compound being differently configured than the first foam pad and the first polishing compound;

wherein the finished lens cover has a transmittance to a thermal spectrum of at least about 60%, exhibits no seams, no significant lensing characteristics, and no significant curvature effect.

2. The method as recited in claim 1, wherein the final desired thickness is no more than 0.014 inch.

3. The method as recited in claim 1, wherein the final desired thickness is from about 0.009 inch to about 0.013 inch.

4. The method as recited in claim 1, wherein at least 50% of the initial thickness of the sidewall is removed to achieve the final desired thickness.

5. The method as recited in claim 1, wherein at least 75% of the initial thickness of the sidewall is removed to achieve the final desired thickness.

6. The method as recited in claim 1, wherein from about 80% to about 85% of the initial thickness of the sidewall is removed to achieve the final desired thickness.

7. The method as recited in claim 1, wherein the initial as molded sidewall thickness is about 0.1 inch.

8. The method as recited in claim 1, wherein the initial as molded sidewall thickness is about 0.060 inch.

9. The method as recited in claim 1, wherein the finished lens cover has a transmittance to a thermal spectrum within a range of about 65% to about 70%.

10. The method as recited in claim 1, wherein the sidewall includes no taper.

11. The method as recited in claim 1, wherein any taper included in the sidewall is less than 4%.

12. The method as recited in claim 1, wherein any taper included in the sidewall is less than 3%.

13. The method as recited in claim 1, wherein any taper included in the sidewall is less than 1%.

14. The method as recited in claim 1, wherein the cap structure has a diameter from about 2.5 inches to about 3 inches in diameter.

15. The method as recited in claim 1, wherein the finished lens cover exhibits reflection characteristics relative to a thermal spectrum of no more than 30%.

16. The method as recited in claim 1, wherein the finished lens cover exhibits reflection characteristics relative to a thermal spectrum of no more than 10%.

17. The method as recited in claim 1, wherein the finished lens cover exhibits reflection characteristics relative to a thermal spectrum of no more than 5%.

18. The method as recited in claim 1, wherein the wet sanding and wet polishing steps remove less than 0.001 inch in thickness from the sidewall.

19. The method as recited in claim 1, wherein lubricant and/or coolant is applied while machining away a portion of the initial sidewall thickness.

20. The method as recited in claim 1, the first foam pad is of a coarser foam structure than the second foam pad.

* * * * *